United States Patent
Herling et al.

(10) Patent No.: US 11,144,115 B2
(45) Date of Patent: Oct. 12, 2021

(54) PORTING PHYSICAL OBJECT INTO VIRTUAL REALITY

(71) Applicant: Facebook Technologies, LLC, Menlo Park, CA (US)

(72) Inventors: Jan Herling, Seattle, WA (US); Adrian Brian Ratter, Redwood City, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/672,145

(22) Filed: Nov. 1, 2019

(65) Prior Publication Data
US 2021/0132683 A1 May 6, 2021

(51) Int. Cl.
*G06F 3/02* (2006.01)
*G06F 3/01* (2006.01)
*G06T 7/70* (2017.01)

(52) U.S. Cl.
CPC .............. *G06F 3/011* (2013.01); *G06F 3/02* (2013.01); *G06T 7/70* (2017.01)

(58) Field of Classification Search
CPC .... G06F 3/0346; G06F 3/0426; G06F 3/0338; G06F 3/011; G06F 3/0425; G06F 3/017; G06F 3/02; G02B 27/0172; G02B 27/017; G06T 7/70
See application file for complete search history.

(56) References Cited

U.S. PATENT DOCUMENTS

| | | | | |
|---|---|---|---|---|
| 2010/0177035 | A1* | 7/2010 | Schowengerdt | G06F 3/011 345/156 |
| 2015/0293644 | A1* | 10/2015 | Watanabe | G06F 3/017 345/168 |
| 2017/0262045 | A1* | 9/2017 | Rouvinez | G06F 3/011 |
| 2017/0307889 | A1* | 10/2017 | Newman | G02B 27/0172 |
| 2017/0329515 | A1* | 11/2017 | Clement | G06F 3/0346 |
| 2018/0004305 | A1* | 1/2018 | Moseley | G06F 3/0338 |
| 2018/0088682 | A1* | 3/2018 | Tsang | G02B 27/017 |
| 2018/0181199 | A1* | 6/2018 | Harvey | G06F 3/0426 |

(Continued)

FOREIGN PATENT DOCUMENTS

WO  WO-2018/102615 A1  6/2018

OTHER PUBLICATIONS

Foreign Search Report on non-Foley case related to U.S. Appl. No. 16/672,145 dated Jan. 15, 2021.

*Primary Examiner* — Ke Xiao
*Assistant Examiner* — James S Nokham
(74) *Attorney, Agent, or Firm* — Foley & Lardner LLP

(57) ABSTRACT

Disclosed herein are related to a system and a method for porting a physical object in a physical space into a virtual reality. In one approach, the method includes detecting an input device in a physical space relative to a user of the input device. In one approach, the method includes presenting, by a display device to the user, a virtual model of the detected input device in a virtual space at a location and an orientation. The location and the orientation of the virtual model in the virtual space may correspond to a location and an orientation of the input device in the physical space relative to the user. In one approach, the method includes visually providing relative to the virtual model in the virtual space, through the display device, spatial feedback on the user's interaction with the input device in the physical space.

20 Claims, 11 Drawing Sheets

(56) References Cited

U.S. PATENT DOCUMENTS

2018/0232106 A1\*  8/2018  Zhang .................. G06F 3/0425
2018/0284982 A1   10/2018  Veeramani et al.
2018/0350150 A1   12/2018  Powderly et al.

\* cited by examiner

PORTING PHYSICAL OBJECT INTO VIRTUAL REALITY

FIELD OF DISCLOSURE

The present disclosure is generally related to virtual reality, including but not limited to porting an object in a physical space into a virtual reality.

BACKGROUND

An artificial reality such as a virtual reality (VR), an augmented reality (AR), or a mixed reality (MR) provides immersive experience to a user. In one example, a movement of a user wearing a head mounted display (HMD) can be detected, and an image of a virtual reality corresponding to the movement can be rendered. For example, a user wearing the HMD can turn his head to the side, and an image of a virtual object corresponding to a location of the HMD and an orientation of the HMD can be displayed on the HMD to allow the user to feel as if the user is moving within a space of a virtual reality. In some implementations, a user may provide an input, for example through a dedicated handheld input device such as a pointing device for controlling a virtual reality presented.

SUMMARY

Various embodiments disclosed herein are related to providing an input to a virtual reality. In some embodiments, an input device in a physical space relative to a user of the input device is detected. In some embodiments, a virtual model of the detected input device, in a virtual space at a location and an orientation, is presented by a display device to the user. In some embodiments, the location and the orientation of the virtual model in the virtual space correspond to a location and an orientation of the input device in the physical space relative to the user. In some embodiments, relative to the virtual model in the virtual space, spatial feedback on the user's interaction with the input device in the physical space is visually provided through the display device.

In some embodiments, the location and the orientation of the virtual model in the virtual space are determined according to the location and the orientation of the detected input device in the physical space. In some embodiments, an image of the virtual space including the virtual model of the input device is rendered, according to the determined location and the orientation of the virtual model in the virtual space. In some embodiments, a movement of the user in the physical space is detected. In some embodiments, a change in the location and the orientation of the virtual model relative to the user is determined according to the detected movement of the user. In some embodiments, another image of the virtual space including the virtual model of the input device is rendered, according to the change in the location and the orientation of the virtual model relative to the user.

In some embodiments, a six degrees of freedom of the virtual model is determined according to the location and the orientation of the detected input device. In some embodiments, detecting the input device in the physical space relative to the user includes capturing an image of the input device, and detecting a contour or a layout of the input device in the captured image. In some embodiments, a candidate model having a contour or a layout matching or closest to the contour or the layout of the input device is identified from a plurality of candidate models. In some embodiments, the candidate model is determined as the virtual model, in response to the candidate model having the contour or the layout matching or closest to the contour or the layout of the input device. In some embodiments, detecting the contour or the layout of the input device in the captured image includes determining an arrangement of keys on the input device. In some embodiments, the input device comprises a keyboard.

Various embodiments disclosed herein are related to a system for presenting artificial reality. In some embodiments, the system includes a display device, a processor, and a non-transitory computer readable medium. In some embodiments, the non-transitory computer readable medium stores instructions when executed by the processor cause the processor to detect an input device in a physical space relative to a user of the input device, and present, by the display device to the user, a virtual model of the detected input device in a virtual space at a location and an orientation. In some embodiments, the location and the orientation of the virtual model in the virtual space correspond to a location and an orientation of the input device in the physical space relative to the user. In some embodiments, the non-transitory computer readable medium stores instructions when executed by the processor cause the processor to, relative to the virtual model in the virtual space, visually provide, through the display device, spatial feedback on the user's interaction with the input device in the physical space.

In some embodiments, the non-transitory computer readable medium stores instructions when executed by the processor cause the processor to determine the location and the orientation of the virtual model in the virtual space according to the location and the orientation of the detected input device in the physical space. In some embodiments, the non-transitory computer readable medium stores instructions when executed by the processor cause the processor to render an image of the virtual space including the virtual model of the input device, according to the determined location and the orientation of the virtual model in the virtual space.

In some embodiments, the non-transitory computer readable medium stores instructions when executed by the processor cause the processor to detect a movement of the user in the physical space. In some embodiments, the non-transitory computer readable medium stores instructions when executed by the processor cause the processor to determine a change in the location and the orientation of the virtual model relative to the user according to the detected movement of the user. In some embodiments, the non-transitory computer readable medium stores instructions when executed by the processor cause the processor to render another image of the virtual space including the virtual model of the input device, according to the change in the location and the orientation of the virtual model relative to the user.

In some embodiments, the non-transitory computer readable medium stores instructions when executed by the processor cause the processor to determine a six degrees of freedom of the virtual model, according to the location and the orientation of the detected input device. In some embodiments, the processor is configured to detect the input device in the physical space relative to the user by capturing an image of the input device, and detecting a contour or a layout of the input device in the captured image. In some embodiments, the non-transitory computer readable medium stores instructions when executed by the processor cause the processor to identify, from a plurality of candidate models, a candidate model having a contour or a layout matching or closest to the contour or the layout of the input device, and determine the candidate model as the virtual model, in response to the candidate model having the contour or the layout matching or closest to the contour or the layout of the input device.

Various embodiments disclosed herein are related to a head mounted display. In some embodiments, the head mounted display includes an imaging sensor configured to capture an image of a physical space, a processor, and a non-transitory computer readable medium. In some embodiments, the non-transitory computer readable medium stores instructions when executed by the processor cause the processor to activate a physical object in the physical space to generate a virtual model of the physical object during a pass-through mode, and render the virtual model of the physical object during a virtual reality mode. In some embodiments, the head mounted display includes a display device configured to present a view of the physical space to a user of the head mounted display during the pass-through mode, and present a view of a virtual space to the user of the head mounted display during the virtual reality mode. During the virtual reality mode, the display device may not present the view of the physical space to the user of the head mounted display or may occlude the view of the physical space from the user of the head mounted display. The physical object may be an input device (e.g., a keyboard or a mouse).

In some embodiments, the non-transitory computer readable medium stores instructions when executed by the processor cause the processor to detect the physical object in the physical space during the pass-through mode, and identify the virtual model of the detected physical object to activate the physical object in the physical space during the pass-through mode. The non-transitory computer readable medium may store instructions when executed by the processor cause the processor to determine a location and an orientation of the virtual model in the virtual space according to a location and an orientation of the detected physical object in the physical space, and render a first image of the virtual model of the physical object, according to the determined location and the orientation of the virtual model in the virtual space. In some embodiments, the head mounted display further includes a sensor configured to detect or track a movement of the head mounted display during the virtual reality mode. In some embodiments, the non-transitory computer readable medium stores instructions when executed by the processor cause the processor to determine a change in the location and the orientation of the virtual model according to the detected movement of the head mounted display, and render a second image of the virtual model of the physical object according to the change in the location and the orientation of the virtual model.

In some embodiments, the non-transitory computer readable medium stores instructions when executed by the processor cause the processor to detect a layout of keys or buttons of the physical object in the captured image during the pass-through mode to detect the physical object in the physical space during the pass-through mode. In some embodiments, the non-transitory computer readable medium stores instructions when executed by the processor cause the processor to determine, from a plurality of candidate models, a candidate model having a layout matching or closest to the detected layout of the keys or the buttons of the physical object during the pass-through mode. In some embodiments, the non-transitory computer readable medium stores instructions when executed by the processor cause the processor to determine the candidate model as the virtual model, in response to the candidate model having the layout matching or closest to the detected layout of the keys or the buttons of the physical object to identify the virtual model during the pass-through mode. In some embodiments, the non-transitory computer readable medium stores instructions when executed by the processor cause the processor to detect an interaction of a user of the head mounted display with a portion of the virtual model during the virtual reality mode, and indicate, as a feedback, the portion of the virtual model being interacted by the user during the virtual reality mode.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
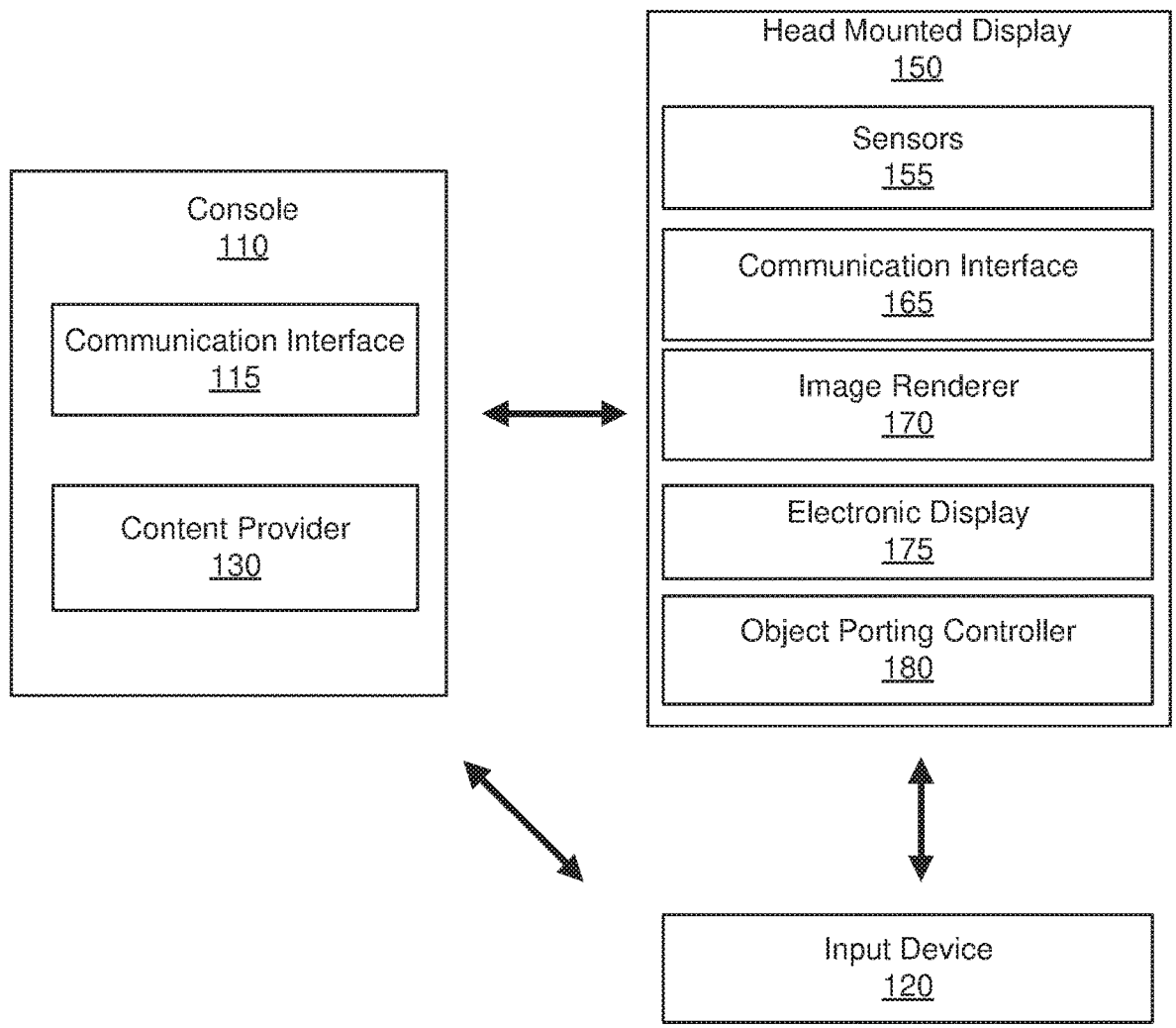
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are embodiments related to systems and methods for porting a physical object in a physical space into a virtual space of a virtual reality. In one aspect, porting a physical object in the physical space into the virtual space includes activating a physical object in the physical space to obtain a virtual model of the physical object, and rendering an image of the virtual model in the virtual space. In some embodiments, a physical object is activated during a pass-through mode, in which a head mounted display (HMD) presents or renders a view of the physical space to a user of the head mounted display. For example, a virtual model of the physical object may be identified or selected during the pass-through mode. In one aspect, the virtual model of the physical object is rendered during a virtual reality mode, in which the head mounted display does not present the view of the physical space to the user of the head mounted display. During the virtual reality mode, the physical object in the physical space may be tracked, and a location and an orientation of the virtual model in the virtual space may be adjusted according to a location and an orientation of the physical object in the physical space. In one aspect, an indication of an interaction of a user with the physical object in the physical space may be presented on the virtual model in the virtual space as a feedback to the user.

Advantageously, activating the physical object during the pass-through mode allows a user of the head mounted display to identify or locate the physical object in the physical space and can generate a virtual model of the physical object. The virtual model can be rendered in the virtual space during the virtual reality mode to allow the user to locate the physical object using the virtual model, even though the view of the physical space may be occluded during the virtual reality mode. In one aspect, the physical object is a generic input device (e.g., a keyboard or a mouse) that may be manufactured or produced by a company different from a company manufacturing or producing the head mounted display and/or a dedicated handheld input device (e.g., a pointing device). By rendering a virtual model of the input device as reference or guidance (e.g., as a proxy for the input device) to the user in the field of view of the user, a user can easily reach out to the virtual model and thus to the input device, and provide inputs to the virtual reality through the input device during the virtual reality mode.

In one aspect, relative to the virtual model in the virtual space (e.g., using the virtual model in the virtual space for spatial guidance), spatial feedback on the user's interaction with the input device in the physical space can be visually provided to the user. In one approach, an input device in a physical space relative to a user of the input device is detected. The virtual model of the detected input device in a virtual space at a location and an orientation may be presented, by a display device to the user. The location and the orientation of the virtual model in the virtual space may correspond to (e.g., track with, or mirror) a location and an orientation of the input device in the physical space relative to the user. Relative to the virtual model in the virtual space (and a virtual representation of the user's hand for instance), spatial feedback on the user's interaction with the input device in the physical space can be visually provided to the user via the virtual space. Accordingly, through the spatial feedback relative to the virtual model, a user may easily locate and reach the input device, and provide inputs through the input device in the physical space while enjoying the virtual reality experience (e.g., while viewing the virtual space instead of the physical space).

Although systems and methods disclosed herein may refer to porting a physical object to a virtual reality, general principles disclosed herein may be applicable to augmented reality, or mixed reality.

FIG. 1 is a block diagram of an example artificial reality system environment 100 in which a console 110 operates. In some embodiments, the artificial reality system environment 100 includes a HMD 150 worn by a user, and a console 110 providing content of an artificial reality to the HMD 150. In one aspect, the HMD 150 may detect its location, orientation, and/or a gaze direction of the user wearing the HMD 150, and can provide the detected location and the gaze direction to the console 110. The console 110 may determine a view within the space of the artificial reality corresponding to the detected location, orientation, and/or the gaze direction, and generate an image depicting the determined view. The console 110 may provide the image to HMD 150 for rendering. In some embodiments, the artificial reality system environment 100 includes an input device 120 that is communicatively coupled to the console 110 or the HMD 150 through a wired cable, a wireless link (e.g., Bluetooth, Wi-Fi, etc.) or both. The input device 120 may be a dedicated hardware (e.g., a pointing device or a controller) with motion sensors, a generic keyboard, a mouse, etc. Through the input device 120, the user may provide inputs associated with the artificial reality presented. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HMD 150. For example, some of the functionality of the HMD 150 may be performed by the console 110. In some embodiments, the console 110 is integrated as part of the HMD 150.

In some embodiments, the HMD 150 includes or corresponds to an electronic component that can be worn by a user and can present or provide an artificial reality experience to the user. The HMD 150 may render one or more images, video, audio, or some combination thereof to provide the artificial reality experience to the user. In some embodiments, audio is presented via an external device (e.g., speakers and/or headphones) that receives audio information from the HMD 150, the console 110, or both, and presents audio based on the audio information. In some embodiments, the HMD 150 includes sensors 155, a communication interface 165, an image renderer 170, an electronic display 175, and/or an object porting controller 180. These components may operate together to detect a location and an orientation of the HMD 150, and/or a gaze direction of the user wearing the HMD 150, and can render an image of a view within the artificial reality corresponding to the detected location and the orientation of the HMD 150, and/or the gaze direction of the user. In other embodiments, the HMD 150 includes more, fewer, or different components than shown in FIG. 1. In some embodiments, the object porting controller 180 may be activated or deactivated according to a control from a user of the HMD 150.

In some embodiments, the sensors 155 include electronic components or a combination of electronic components and software components that detect a location, an orientation of the HMD 150, and/or a gaze direction of the user. Examples of sensors 155 can include: one or more imaging sensors, one or more accelerometers, one or more gyroscopes, one or more magnetometers, a global positioning system, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the imaging sensors can capture an image for detecting a physical object, a user gesture, a shape of the hand, a user interaction, etc. In some embodiments, the sensors 155 detect the translational movement and the rotational movement, and determine an orientation and location of the HMD 150. In one aspect, the sensors 155 can detect the translational movement and the rotational movement with respect to a previous orientation and location of the HMD 150, and determine a new orientation and/or location of the HMD 150 by accumulating or integrating the detected translational movement and/or the rotational movement. Assuming for an example that the HMD 150 is oriented in a direction 25 degrees from a reference direction, in response to detecting that the HMD 150 has rotated 20 degrees, the sensors 155 may determine that the HMD 150 now faces or is oriented in a direction 45 degrees from the reference direction. Assuming for another example that the HMD 150 was located two feet away from a reference point in a first direction, in response to detecting that the HMD 150 has moved three feet in a second direction, the sensors 155 may determine that the HMD 150 is now located at a vector multiplication of the two feet in the first direction and the three feet in the second direction from the reference point. In one aspect, according to the location and the orientation of the HMD 150, a gaze direction of the user can be determined or estimated.

In some embodiments, the sensors 155 can include electronic components or a combination of electronic components and software components that generate sensor measurements of a physical space. Examples of the sensors 155 for generating sensor measurements can include one or more imaging sensors, a heat sensor, etc. In one example, an imaging sensor can capture an image corresponding to the user's field of view (or a view from a location of the HMD 150 according to an orientation of the HMD 150) in the physical space. An image processing can be performed on the captured image to detect a physical object or a portion of the user in the physical space.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link, a wired link, or both. Examples of the wireless link can include a cellular communication link, a near field communication link, Wi-Fi, Bluetooth, or any communication wireless communication link. Examples of the wired link can include a universal serial bus (USB), Ethernet, Firewire, high-definition multimedia interface (HDMI), or any wired communication link. In the embodiments, in which the console 110 and the HMD 150 are implemented on a single system, the communication interface 165 may communicate with the console 110 through at least a bus connection or a conductive trace. Through the communication link, the communication interface 165 may transmit to the console 110 data indicating the determined location of the HMD 150 and the orientation of the HMD 150, and/or the gaze direction of the user. Moreover, through the communication link, the communication interface 165 may receive from the console 110 data indicating image to be rendered.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)). The image renderer 170 may receive, through the communication interface 165, data describing an image to be rendered, and render the image through the electronic display 175. In some embodiments, the data from the console 110 may be compressed or encoded, and the image renderer 170 may decompress or decode the data to generate and render the image. The image renderer 170 may receive the compressed image from the console 110, and decompress the compressed image, such that a communication bandwidth between the console 110 and the HMD 150 can be reduced. In one aspect, the process of detecting, by the HMD 150, the location of the HMD 150, the orientation of the HMD and/or the gaze direction of the user wearing the HMD 150, and generating and transmitting, by the console 110, a high resolution image (e.g., 1920 by 1080 pixels) corresponding to the detected location, the orientation, and/or the gaze direction to the HMD 150 may be computationally exhaustive and may not be performed within a frame time (e.g., less than 11 ms). The image renderer 170 may generate one or more images through a shading process and a reprojection process when an image from the console 110 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HMD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the object porting controller 180 includes an electronic component or a combination of an electronic component and a software component that activates a physical object and generates a virtual model of the physical object. In one approach, the object porting controller 180 detects a physical object in a physical space during a pass-through mode, in which the sensors 155 can capture an image of a user's view (or field of view) of the physical space, and the electronic display 175 can present the captured image to the user. The object porting controller 180 may a generate a virtual model of the physical object, and present the virtual model in a virtual space during a virtual reality mode, in which the electronic display 175 can display the user's field of view of the virtual space. The view of the physical space may be occluded or prevented during the virtual reality mode. With the virtual model of the physical object presented in the virtual space for spatial guidance or reference, a user can locate and reach the corresponding physical object while enjoying the virtual reality during the virtual reality mode. Detailed description on the activating the physical object and rendering a virtual model of the physical object are provided below with respect to FIGS. 3-7.

In some embodiments, the console 110 is an electronic component or a combination of an electronic component and a software component that provides content to be rendered through the HMD 150. In one aspect, the console 110 includes a communication interface 115 and a content provider 130. These components may operate together to determine a view of the artificial reality corresponding to the location of the HMD 150, the orientation of the HMD 150, and/or the gaze direction of the user of the HMD 150, and can generate an image of the artificial reality corresponding to the determined view. In other embodiments, the console 110 includes more, fewer, or different components than shown in FIG. 1. In some embodiments, the console 110 performs some or all functionalities of the HMD 150. In some embodiments, the console 110 is integrated as part of the HMD 150 as a single device.

In some embodiments, the communication interface 115 is an electronic component or a combination of an electronic component and a software component that communicates with the HMD 150. The communication interface 115 may be a counterpart component to the communication interface 165 to communicate through a communication link (e.g., USB cable). Through the communication link, the communication interface 115 may receive from the HMD 150 data indicating the determined location of the HMD 150, the orientation of the HMD 150, and/or the determined gaze direction of the user. Moreover, through the communication link, the communication interface 115 may transmit to the HMD 150 data describing an image to be rendered.

The content provider 130 is a component that generates content to be rendered according to the location of the HMD 150, the orientation of the HMD 150, and/or the gaze direction of the user of the HMD 150. In one aspect, the content provider 130 determines a view of the artificial reality according to the location of the HMD 150, the orientation of the HMD 150, and/or the gaze direction of the user of the HMD 150. For example, the content provider 130 maps the location of the HMD 150 in a physical space to a location within a virtual space, and determines a view of the virtual space along the gaze direction from the mapped location in the virtual space. The content provider 130 may generate image data describing an image of the determined view of the virtual space, and transmit the image data to the HMD 150 through the communication interface 115. In some embodiments, the content provider 130 generates metadata including motion vector information, depth information, edge information, object information, etc., associated with the image, and transmits the metadata with the image data to the HMD 150 through the communication interface 115. The content provider 130 may compress and/or encode the data describing the image, and can transmit the compressed and/or encoded data to the HMD 150. In some embodiments, the content provider 130 generates and provides the image to the HMD 150 periodically (e.g., every 11 ms).

Figure 2:
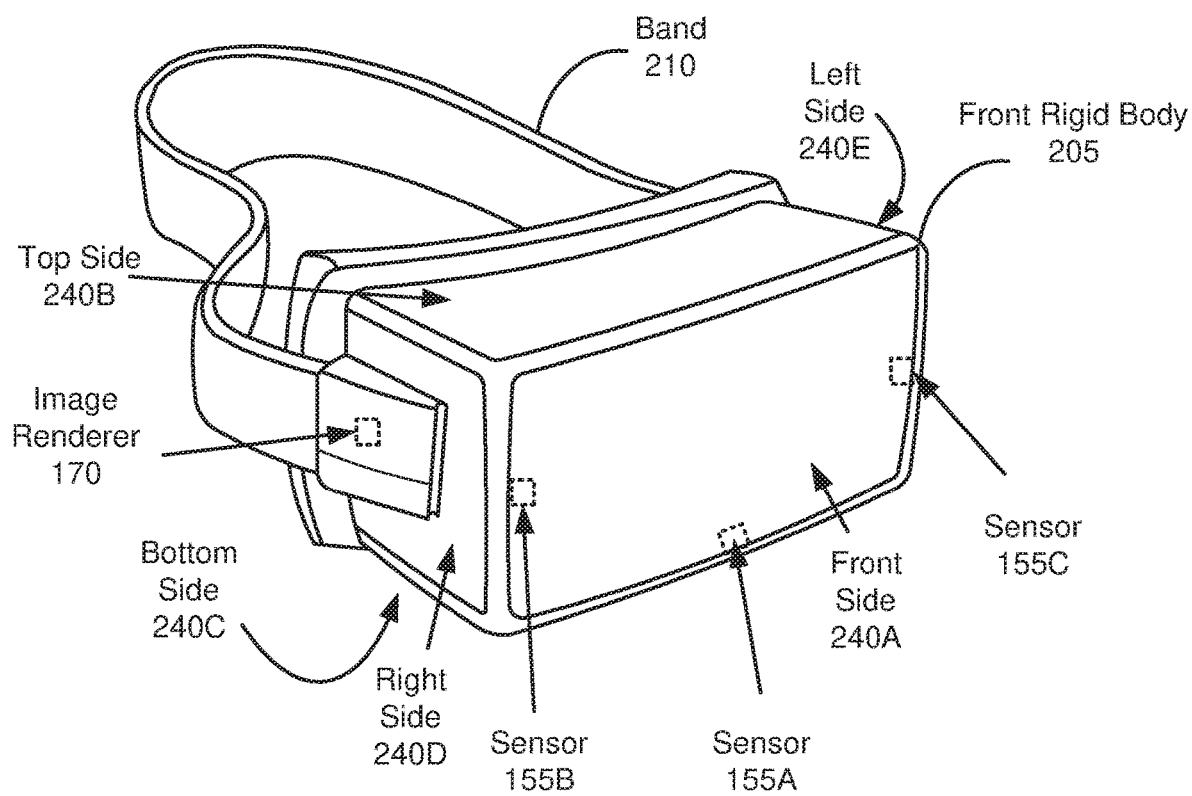
FIG. 2 is a diagram of a head mounted display, according to an example implementation of the present disclosure.

FIG. 2 is a diagram of the HMD 150, in accordance with an example embodiment. In some embodiments, the HMD 150 includes a front rigid body 205 and a band 210. The front rigid body 205 includes the electronic display 175 (not shown in FIG. 2), the sensors 155A, 155B, 155C, and the image renderer 170. The sensor 155A may be an accelerometer, a gyroscope, a magnetometer, or another suitable type of sensor that detects motion and/or location. The sensors 155B, 155C may be imaging sensors that capture images for detecting a physical object, a user gesture, a shape of a hand, a user interaction, etc. The HMD 150 may include additional components (e.g., GPS, wireless sensor, microphone, heat sensor, etc.). In other embodiments, the HMD 150 has a different configuration than shown in FIG. 2. For example, the image renderer 170, and/or the sensors 155A, 155B, 155C may be disposed in different locations than shown in FIG. 2.

Figure 3:
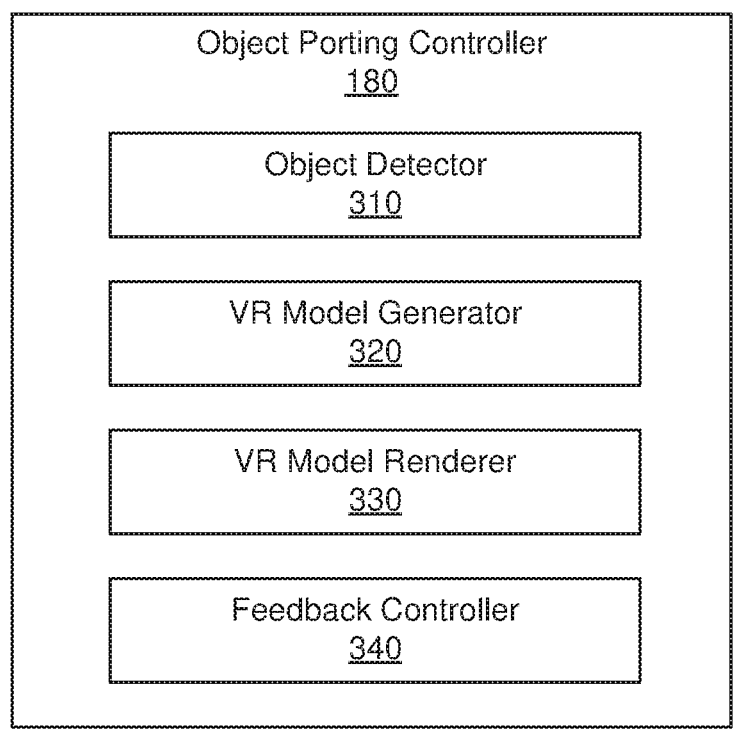
FIG. 3 is a diagram of an object porting controller, according to an example implementation of the present disclosure.

FIG. 3 is a diagram of an object porting controller 180 of FIG. 1, according to an example implementation of the present disclosure. In some embodiments, the object porting controller 180 includes an object detector 310, a VR model generator 320, a VR model renderer 330, and a feedback controller 340. These components may operate together to detect a physical object and present a virtual model of the physical object. The virtual model may be identified, activated or generated, and may be presented, such that a user of HMD 150 may locate the physical object while enjoying the virtual reality during the virtual reality mode. In some embodiments, these components may be implemented as hardware, software, or a combination of hardware and software. In some embodiments, these components are implemented as application specific integrated circuit (ASIC) or a field programmable gate array (FPGA). In some embodiments, these components are implemented as a processor and a non-transitory computer readable medium storing instructions when executed by the processor cause the processor to perform various processes disclosed herein. In some embodiments, the object porting controller 180 includes more, fewer, or different components than shown in FIG. 3. In some embodiments, functionalities of some components may be performed by or in conjunction with the content provider 130 or a remote server. For example, some functionalities of the object detector 310, the VR model generator 320, or both, may be performed by the content provider 130 or a remote server. In some embodiments, the object porting controller 180 includes more, fewer, or different components than shown in FIG. 3.

In some embodiments, the object detector 310 is or includes a component that detects a physical object in a physical space according to a captured image. In one application, the object detector 310 detects an input device (e.g., keyboard or a mouse) in the physical space by performing image processing on the captured image. In one approach, the object detector 310 detects a contour, an outline, and/or a layout of keys or buttons or a combination of these, of the physical object in the captured image, and determines a type of the physical object according to the detected contour, outline, and/or the layout of keys or buttons. For example, the object detector 310 determines whether a physical object in the user's point of view of the physical space is a keyboard or a mouse according to the detected contour, outline, and/or the layout of keys or buttons of the physical object. The object detector 310 may also locate the physical object according to a heat sensor that detects a heat map of the physical object. In one example, the object detector 310 may detect that the physical object has 101/102 keys according to an outline of the physical object in the captured image, and determine that the physical object is a keyboard.

In one aspect, the object detector 310 detects the physical object and presents, through the electronic display 175, a view or a portion of the view of the physical space to the user of the HMD 150. For example, an image (e.g., of a physical object and/or part of a user) captured by the imaging sensor (e.g., sensor 155B, 155C) of the HMD 150 can be presented (e.g., with or without blending with imagery of a virtual model and/or virtual space) to the user through the electronic display 175 (e.g., in a pass-through mode). Hence, a user wearing the HMD 150 can easily detect and/or locate a physical object in a physical space through the HMD 150, e.g., using image processing on image(s) acquired by the imaging sensor. Accordingly, a contour, an outline, and/or a layout of keys or buttons or a combination of these, of the physical object can be easily detected.

In some embodiments, the VR model generator 320 is or includes a component that generates, obtains, or identifies a virtual model for the detected physical object. In one approach, the VR model generator 320 stores a plurality of candidate models for different manufacturing companies, brands and/or product models. The VR model generator 320 may compare the detected contour, outline, and/or layout of keys or buttons with contours, outlines, and/or layouts of keys or buttons of the plurality of candidate models, and identifies or determines a candidate model having a contour, outline, and/or layout of keys or buttons matching or closest to the detected contour, outline, and/or layout of keys of the physical object. The VR model generator 320 may detect or receive a product identification of the physical object, and identify or determine a candidate model corresponding to the detected product identification. The virtual model generator 320 may generate, determine, obtain, or select the determined candidate model as the virtual model of the physical object.

In some embodiments, the VR model renderer 330 is or includes a component that renders an image of the virtual model of the physical object. In one approach, the VR model renderer 330 tracks a physical object in the captured image, and determines a location and an orientation of the physical object relative to the user or the HMD 150. In one aspect, a location and an orientation of the physical object relative to the user or the HMD 150 may change, because the user may move around during the virtual reality mode. The VR model renderer 330 may determine a six degrees of freedom (e.g., forward/backward (surge), up/down (heave), left/right (sway) translation) of the virtual model such that the location and the orientation of the virtual model in the virtual space relative to the user or the HMD 150 as viewed or displayed, can correspond to the location and the orientation of the physical object relative to the user or the HMD 150 in the captured image. The VR model renderer 330 may track predetermined points of the physical object (e.g., four corners and/or sides of a keyboard) by performing image processing on the captured image, and can determine the location and the orientation of the virtual model that allow corresponding points of the virtual model to match, correspond, track or fit the predetermined points of the physical object in the captured image. The VR model renderer 330 may present the virtual model according to the location and the orientation of the virtual model through the electronic display 175. In one aspect, the VR model renderer 330 tracks the physical object and updates the location and the orientation of the virtual model during the virtual reality mode, in which the electronic display 175 presents the user's point/field of view of a virtual space and does not present the view of the physical space. In one aspect, without the virtual model of the physical object, a user enjoying the virtual reality in the virtual reality mode may lose track of where the physical object is, because the view of the physical space is prevented or occluded during the virtual reality mode. Due to the virtual model presented in the virtual space and acting as spatial guidance or reference, the user may easily locate and reach the physical object while enjoying the virtual reality during the virtual reality mode.

In some embodiments, the feedback controller 340 is or includes a component that generates spatial feedback of a user interaction with the physical object. In one aspect, the feedback controller 340 detects and tracks a hand of the user of the HMD 150 in the captured image, and visually provides a spatial feedback on the user's movement and/or interaction with the physical object through the electronic display 175 during the virtual reality mode. The spatial feedback may be provided relative to the virtual model. In one example, the feedback controller 340 determines whether the user's hand is within a predetermined distance from (or proximity to) the physical object. If the user's hand is within the predetermined distance from the physical object (e.g., keyboard), the feedback controller 340 may generate or render a virtual model of the user's hand and present the virtual model of the user's hand in the virtual space through the electronic display 175. If the user's hand is not within the predetermined distance from the physical object (e.g., keyboard), the feedback controller 340 may not present or render the virtual model of the user's hand through the electronic display 175. In some embodiments, the feedback controller 340 determines or generates a region (e.g., rectangular region or other regions) surrounding the virtual model in the virtual space, and may present the region through the electronic display 175. When the user's hand is within the region, a portion of a virtual model of the hand or a pass-through image of the portion of the hand within the region can be presented (e.g., with or without blending with other imagery) as a spatial feedback. Accordingly, a user may direct the hand's spatial movement and easily reach the physical object, while enjoying the virtual reality in the virtual reality mode.

In one example, the feedback controller 340 determines that a portion of the physical object is in interaction with the user, and indicates that a corresponding portion of the virtual model is in interaction with the user through the electronic display 175 during the virtual reality mode. For example, the feedback controller 340 determines that a key or a button of a keyboard is pressed by performing image processing on the captured image or by receiving an electrical signal corresponding to the user input through the keyboard. The feedback controller 340 may highlight a corresponding key or a corresponding button of a virtual model to indicate which key of the keyboard is pressed. Accordingly, the user can confirm whether the input provided through the physical object is correct or not, while enjoying the virtual reality during the virtual reality mode.

Figure 4:
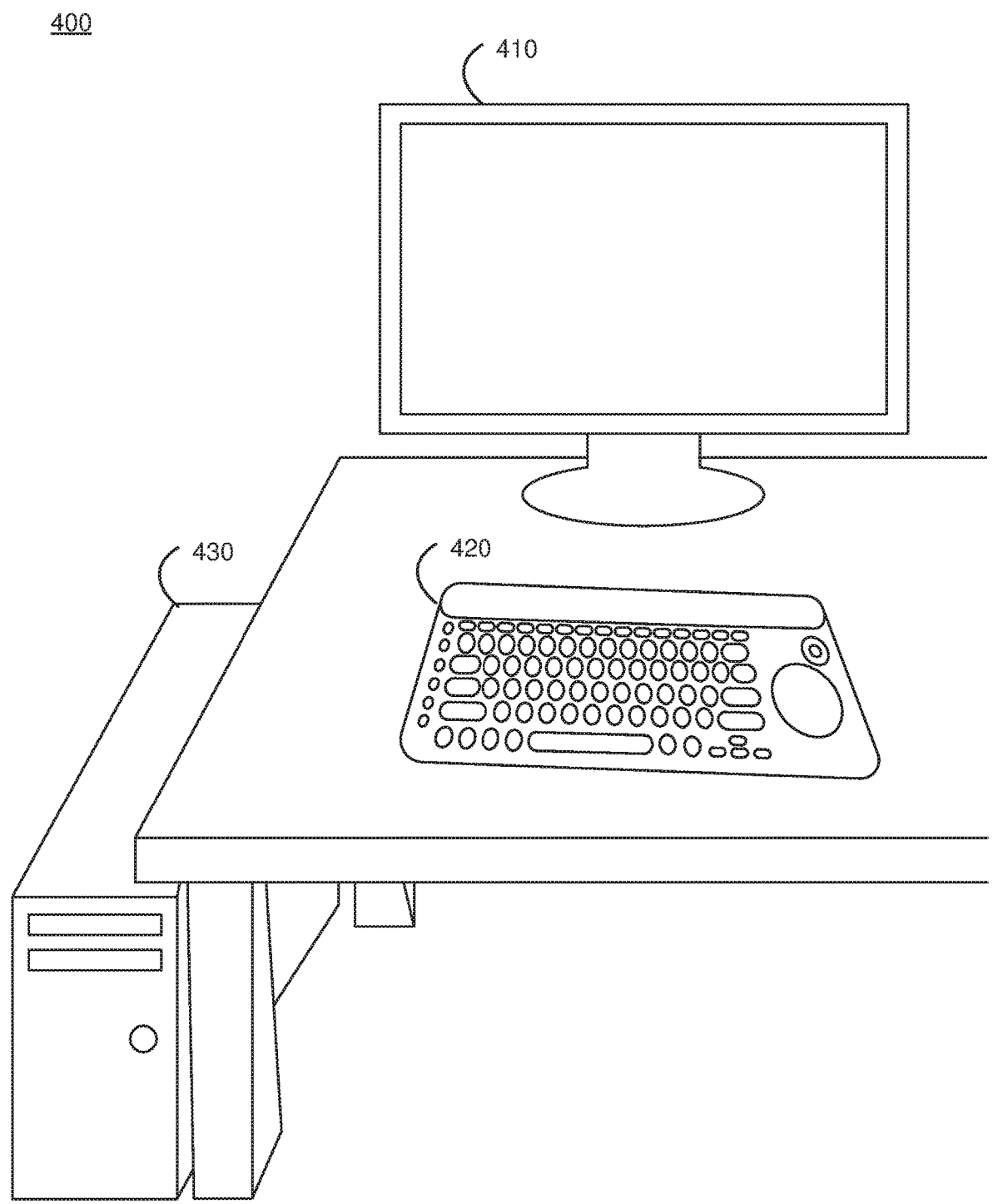
FIG. 4 is a diagram of a view of a physical space with a physical object, according to an example implementation of the present disclosure.

FIG. 4 is a diagram of a view of a physical space 400, according to an example implementation of the present disclosure. The physical space 400 may include a monitor 410, a keyboard 420, and a computing device 430. The keyboard 420 may correspond to the input device 120 and the computing device 430 may correspond to the console 110 of FIG. 1. The keyboard 420 may be communicatively coupled to the computing device 430 and/or the HMD 150, and may be utilized to provide input to virtual reality. In one aspect, the view of the physical space 400 corresponds to a user's point of view through the HMD 150, e.g., in a pass-through mode. The HMD 150 may capture an image of the view of the physical space with image sensors and present the captured image on an electronic display, such that the user can feel as if the user is seeing through the HMD 150. In one example, the physical space 400 may also include a dedicated input device (e.g., a pointing device) with complex motion sensors, which may not be within the view of the physical space 400 shown in FIG. 4.

In one approach, the HMD 150 detects that the keyboard 420 is within the view of the physical space 400, and determines, obtains, identifies, or generates a virtual model of the keyboard 420. The HMD 150 may determine a contour, an outline, and/or a layout of keys or buttons of the keyboard 420, and determine, from a plurality of candidate models, a candidate model having a contour, an outline, and/or a layout of keys or buttons matching or closest to the contour, the outline, and/or the layout of keys or buttons of the keyboard 420. The virtual model may be presented or rendered during the virtual reality mode and/or the pass-through mode.

Figure 5A:
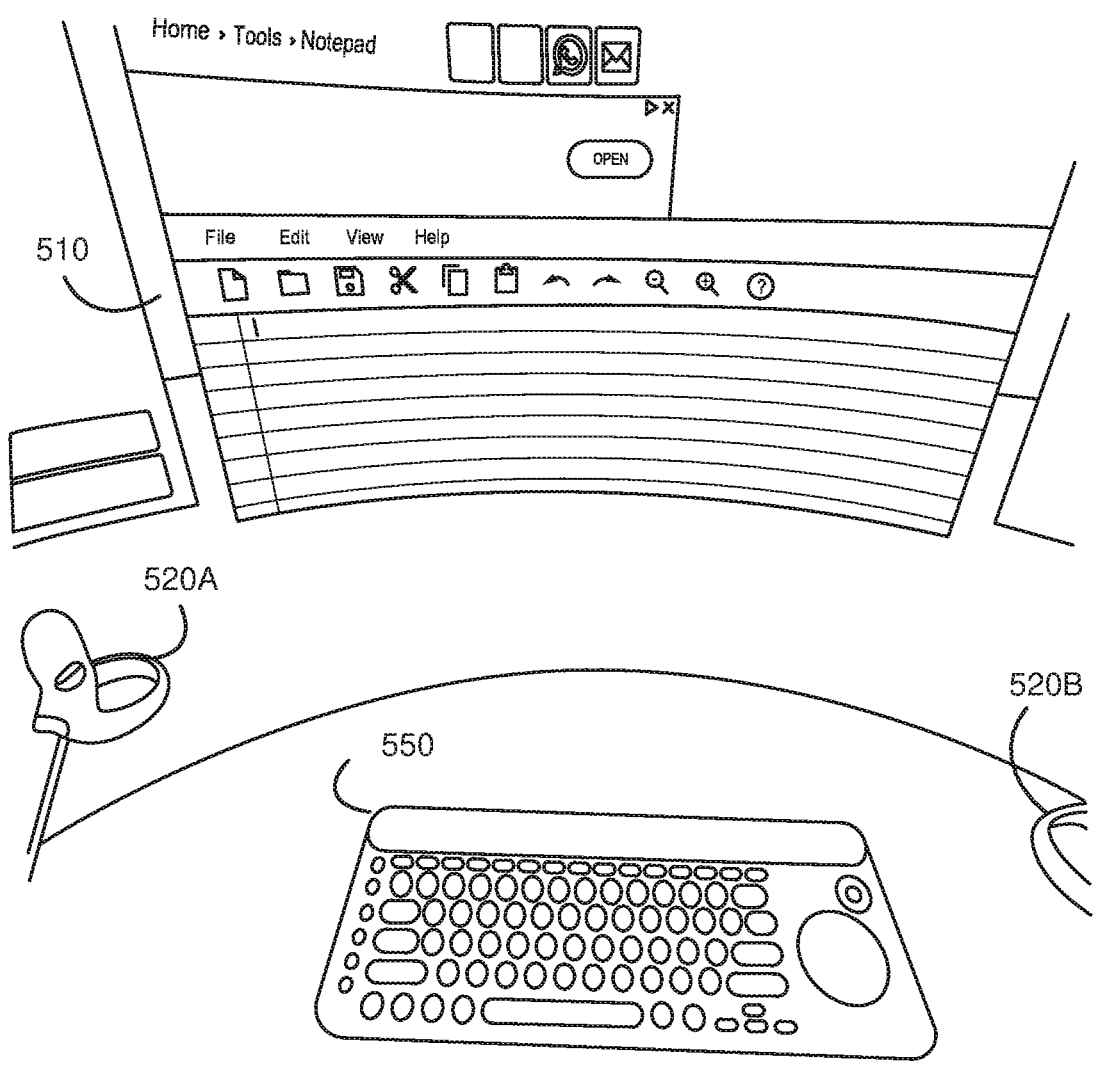
FIG. 5A is a diagram of a view of a virtual space including a virtual model of a physical object during a virtual reality mode, according to an example implementation of the present disclosure.

FIG. 5A is a diagram of a view of a virtual space 500 during a virtual reality mode, according to an example implementation of the present disclosure. The virtual space 500 may include a virtual application 510, virtual models 520A, 520B corresponding to dedicated input devices (e.g., controllers or pointing devices), and a virtual model 550 corresponding to the keyboard 420. The HMD 150 may track the keyboard 420 in the physical space, and determine a location and an orientation of the virtual model relative to the user or the HMD 150 as viewed in the virtual space 500 according to the tracked keyboard 420 in the captured image. The HMD 150 may present the virtual model 550 according to the determined location and orientation of the virtual model. Hence, the user can move around and enjoy the virtual reality during the virtual reality mode, and can easily locate and provide input through the keyboard 420 according to the location and orientation of the virtual model 550 presented in the virtual space 500.

Figure 5B:
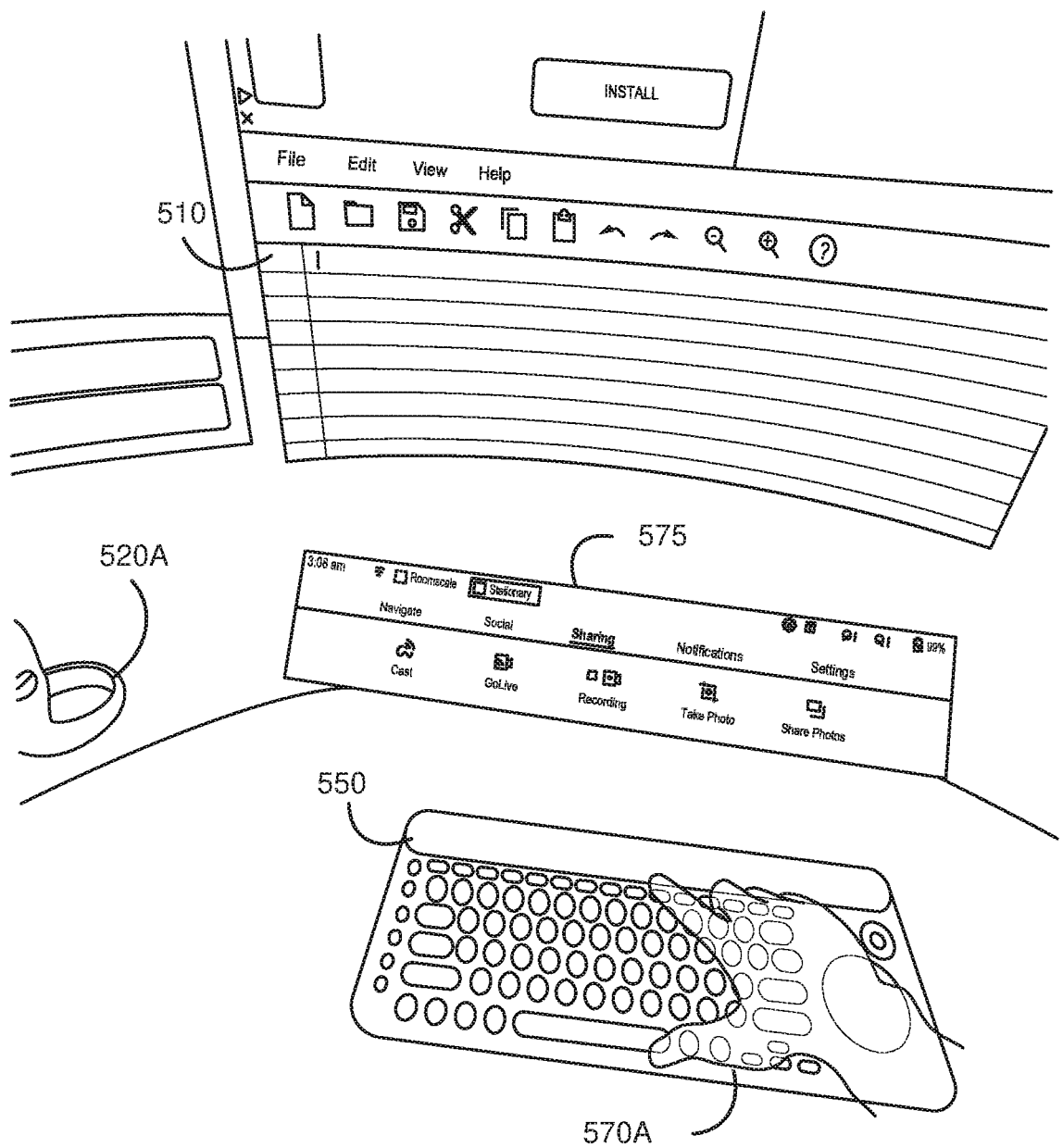
FIG. 5B is a diagram of a view of a virtual space including a virtual model of a physical object at a first location during a virtual reality mode, according to an example implementation of the present disclosure.
Figure 5C:
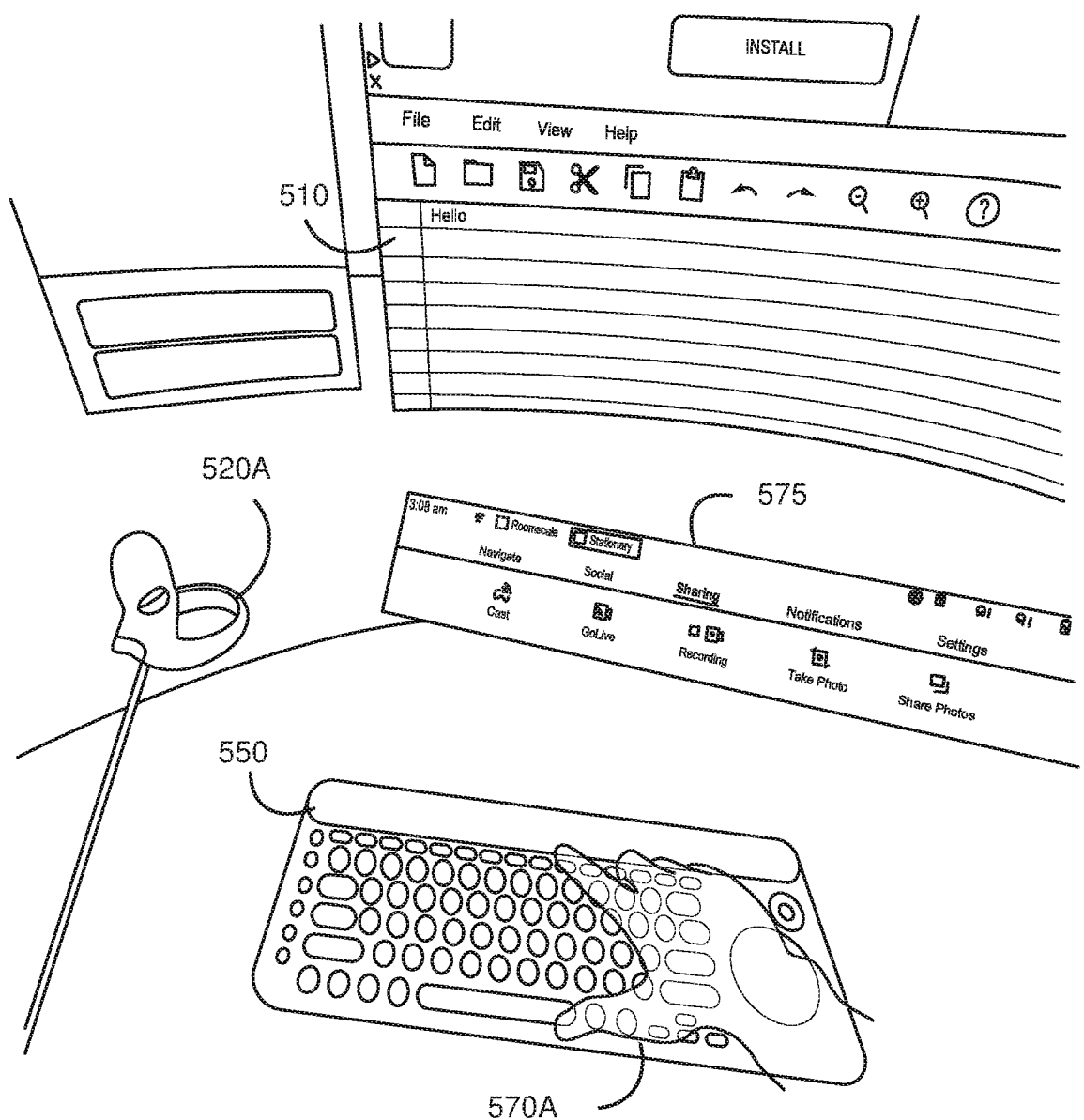
FIG. 5C is a diagram of a view of a virtual space including a virtual model of a physical object at a second location during a virtual reality mode, according to an example implementation of the present disclosure.

FIG. 5B is a diagram of a view of a virtual space 500 including the virtual model 550 at a first location, and FIG. 5C is a diagram of a view of a virtual space 500 including the virtual model 550 at a second location according to an example implementation of the present disclosure. In one example, a navigation bar 575 may be presented within the virtual space 500 to allow the user to start, control, or navigate through different applications in the virtual reality. In one example, a user may grab and relocate or move the keyboard 420 from the first location to the second location. The HMD 150 can track the keyboard 420, and can present the virtual model 550 with a location and an orientation that would correspond to the new location and the new orientation of the keyboard 420. Accordingly, a user can visually locate the keyboard 420 at a corresponding location in the physical space based on the virtual model 550 at a new location in the virtual space 500.

In one example, the HMD 150 visually provides a spatial feedback to the user such that the user can easily reach out to the keyboard 420. As shown in FIG. 5C, the HMD 150 may detect and track a hand of the user in the captured image. If the HMD 150 determines that the user hand is within a predetermined distance from the keyboard 420, the HMD 150 may generate and present a virtual model 570A (or virtual representation) of the hand in the virtual space 500. In one aspect, the virtual model 570A of the hand provides a spatial feedback relative to the virtual model 550 in the virtual space 500, and allows the user to gauge locations of his hands relative to the keyboard 420 in two or three dimensional space.

Figure 5D:
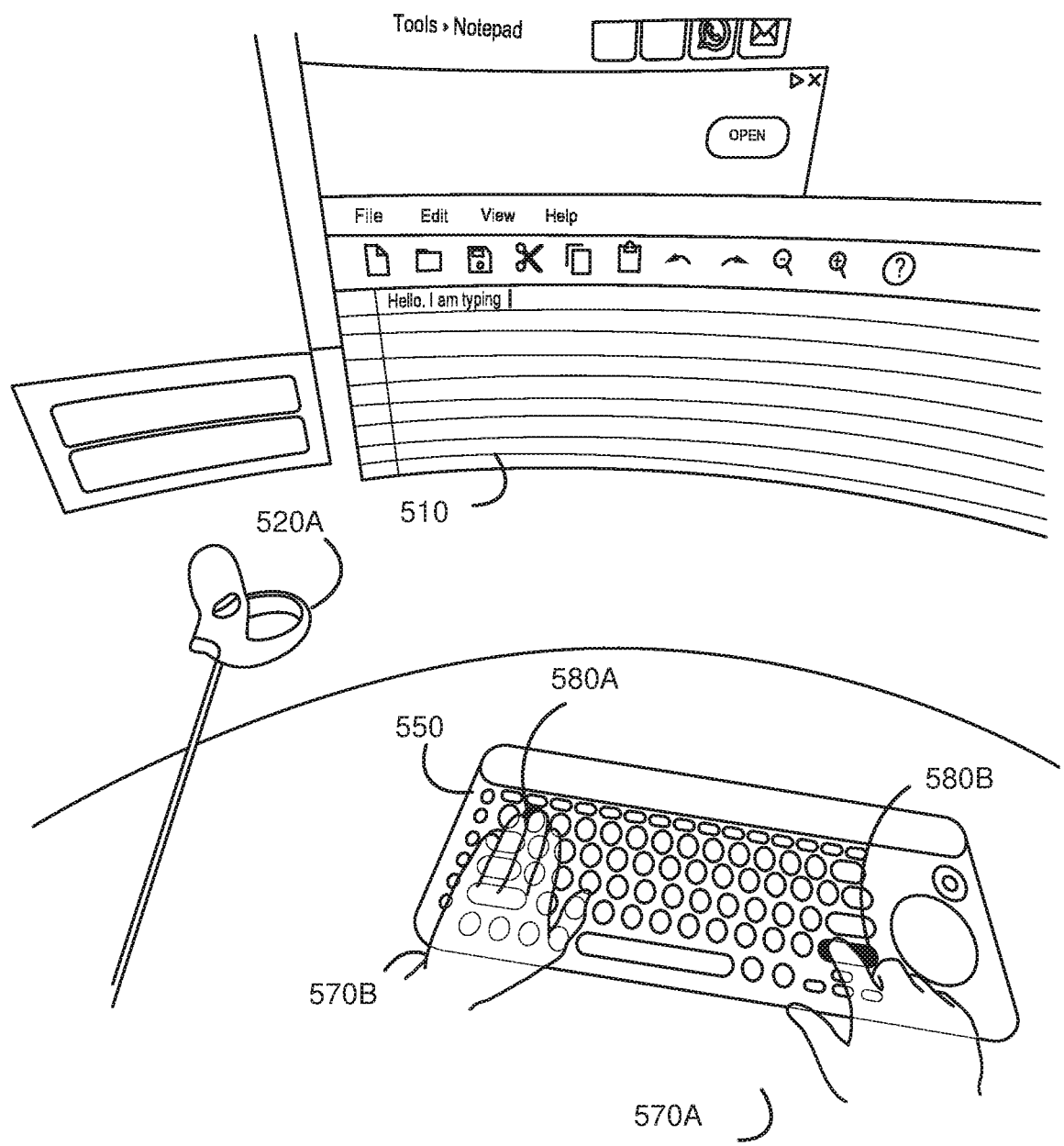
FIG. 5D is a diagram of a view of a virtual space including an indication of a feedback on a user interaction with a physical object during a virtual reality mode, according to an example implementation of the present disclosure.

FIG. 5D is a diagram of a view of a virtual space 500 during a virtual reality mode, according to an example implementation of the present disclosure. In one example, the HMD 150 determines that one or more portions or keys of the keyboard 420 are interacted with the user, and indicates that one or more corresponding portions 580A, 580B of the virtual model 550 are in interaction with the user during the virtual reality mode. For example, the HMD 150 determines that keys of the keyboard 420 are pressed, and generates (visual and/or audio) indications for the portions 580A, 580B of the virtual model 550 corresponding to the pressed keys. Accordingly, the user can confirm whether the input provided through the keyboard 420 is correct or not, while enjoying the virtual reality during the virtual reality mode.

Figure 6:
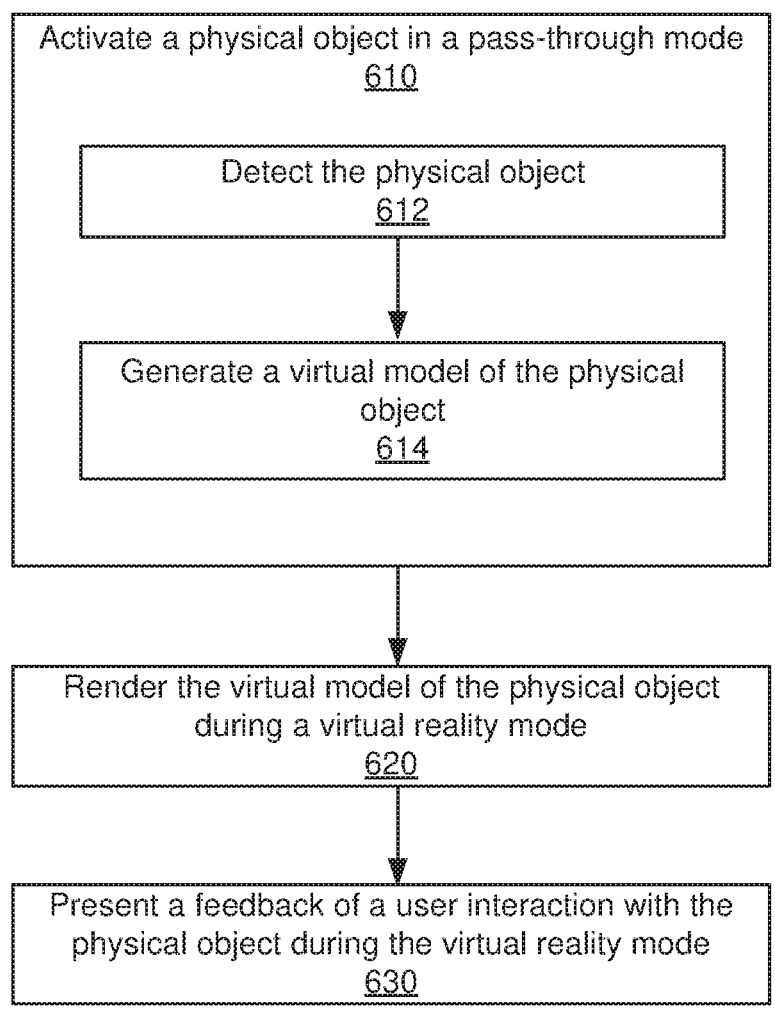
FIG. 6 is a flow chart illustrating a process of porting a physical object in a physical space into a virtual reality, according to an example implementation of the present disclosure.

FIG. 6 is a flow chart illustrating a process 600 of porting a physical object in a physical space into a virtual reality, according to an example implementation of the present disclosure. In some embodiments, the process 600 is performed by a user device (e.g., HMD 150). In some embodiments, the process 600 is performed by other entities or in conjunction with other devices (e.g., the console 110 or a remote server). In some embodiments, the process 600 includes more, fewer, or different steps than shown in FIG. 6.

In one approach, the user device activates 610 a physical object in a physical space. The physical object may be an input device (e.g., a keyboard or a mouse). In one aspect, activating the physical object in the physical space includes detecting 612 the physical object and generating 614 a virtual model of the physical object. In one approach, the user device includes an image sensor that captures an image of the user's point of view. The user device may perform image processing on the captured image to determine or detect a contour, an outline, and/or a layout of keys or buttons of the physical object. The user device may compare the contour, the outline, and/or the layout of keys or buttons of the physical object with contours, outlines, and/or layouts of keys or buttons of candidate virtual models, and can determine a candidate model having a contour, an outline, and/or a layout of keys or buttons matching or closest to the contour, the outline, and/or the layout of keys or buttons of the physical object. The user device may select or determine the candidate model as the virtual model of the physical object. Additionally or alternatively, the user device may detect or receive a product identification of the physical object, and identify or determine a candidate model corresponding to the detected product identification.

In one approach, the user device renders 620 the virtual model of the physical object during a virtual reality mode. During the virtual reality mode, the user device may present a user's point of view of a virtual space to the user of user device. In one aspect, the user device determines a location and an orientation (or six degrees of freedom) of the virtual model in the virtual space, such that the contour, the outline, and/or the layout of keys or buttons of the virtual model can match or fit close to the contour, the outline, and/or the layout of keys or buttons of the physical object in the captured image. The user device may track the physical object, and can update the location and the orientation of the virtual model relative to the user or the user device. Hence, the user can move around and enjoy the virtual reality during the virtual reality mode, and still easily locate and reach the physical object according to the virtual model presented in the virtual space.

In one approach, the user device visually presents 630 a feedback of a user interaction with (and/or a user's proximity or movement relative to) the physical object during the virtual reality mode. In one example, the user device determines that one or more portions or keys of the physical object are in interaction with the user, and indicates that one or more corresponding portions of the virtual model are in interaction with (e.g., in contact or activated by) the user during the virtual reality mode. For example, the user device determines that keys of the keyboard are pressed, and highlight portions of the virtual model corresponding to the pressed keys. Accordingly, the user can confirm whether the input provided through the keyboard is correct or not, while enjoying the virtual reality during the virtual reality mode.

Figure 7:
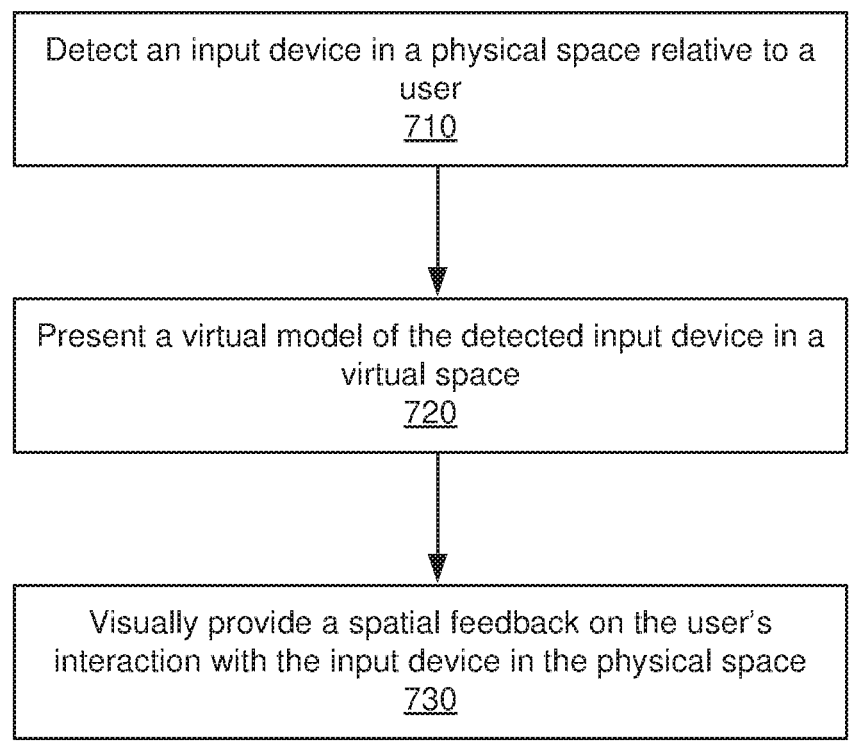
FIG. 7 is a flow chart illustrating a process of providing, in a virtual reality, a spatial feedback on a user's interaction with an input device in a physical space, according to an example implementation of the present disclosure.

FIG. 7 is a flow chart illustrating a process 700 of providing, in a virtual reality, a spatial feedback on a user's interaction with an input device in a physical space, according to an example implementation of the present disclosure. In some embodiments, the process 700 is performed by a user device (e.g., HMD 150). In some embodiments, the process 700 is performed by other entities or in conjunction with other devices (e.g., the console 110 or a remote server). In some embodiments, the process 700 includes more, fewer, or different steps than shown in FIG. 7.

In one approach, the user device detects 710 an input device in a physical space relative to a user. In one approach, the user device presents 720 a virtual model of the detected input device in a virtual space. The user device may detect and present a virtual model as described above with respect to FIG. 6. Thus, duplicated description thereof is omitted herein for the sake of brevity.

In one approach, the user device visually provides 730, relative to the virtual model in the virtual space, a spatial feedback on the user's interaction with (and/or proximity or movement relative to) the input device in the physical space. For example, as shown in FIG. 5C, the user device may detect and track a hand of the user in the captured image. If the user hand is within a predetermined distance from the input device, the user device may generate and present a virtual model of the hand (e.g., to provide spatial feedback and/or guidance) in the virtual space. If the user hand is not within a predetermined distance from the input device, the user device may not present the virtual model of the hand. Hence, the virtual model of the hand provides a spatial feedback relative to the virtual model in the virtual space, and allows the user to determine or recognize locations of his hands respect to the input device in the physical space.

Various embodiments disclosed herein are related to a head mounted display. In some embodiments, the head mounted display includes an imaging sensor configured to capture an image of a physical space, a processor, and a non-transitory computer readable medium. In some embodiments, the non-transitory computer readable medium stores instructions when executed by the processor cause the processor to activate a physical object in the physical space to generate a virtual model of the physical object during a pass-through mode, and render the virtual model of the physical object during a virtual reality mode. In some embodiments, the head mounted display includes a display device configured to present a view of the physical space to a user of the head mounted display during the pass-through mode, and present a view of a virtual space to the user of the head mounted display during the virtual reality mode. During the virtual reality mode, the display device may not present the view of the physical space to the user of the head mounted display or may occlude the view of the physical space from the user of the head mounted display. The physical object may be an input device (e.g., a keyboard or a mouse).

In some embodiments, the non-transitory computer readable medium stores instructions when executed by the processor cause the processor to detect the physical object in the physical space during the pass-through mode, and identify the virtual model of the detected physical object to activate the physical object in the physical space during the pass-through mode. The non-transitory computer readable medium may store instructions when executed by the processor cause the processor to determine a location and an orientation of the virtual model in the virtual space according to a location and an orientation of the detected physical object in the physical space, and render a first image of the virtual model of the physical object, according to the determined location and the orientation of the virtual model in the virtual space. In some embodiments, the head mounted display further includes a sensor configured to detect or track a movement of the head mounted display during the virtual reality mode. In some embodiments, the non-transitory computer readable medium stores instructions when executed by the processor cause the processor to determine a change in the location and the orientation of the virtual model according to the detected movement of the head mounted display, and render a second image of the virtual model of the physical object according to the change in the location and the orientation of the virtual model.

In some embodiments, the non-transitory computer readable medium stores instructions when executed by the processor cause the processor to detect a layout of keys or buttons of the physical object in the captured image during the pass-through mode to detect the physical object in the physical space during the pass-through mode. In some embodiments, the non-transitory computer readable medium stores instructions when executed by the processor cause the processor to determine, from a plurality of candidate models, a candidate model having a layout matching or closest to the detected layout of the keys or the buttons of the physical object during the pass-through mode. In some embodiments, the non-transitory computer readable medium stores instructions when executed by the processor cause the processor to determine the candidate model as the virtual model, in response to the candidate model having the layout matching or closest to the detected layout of the keys or the buttons of the physical object to identify the virtual model during the pass-through mode. In some embodiments, the non-transitory computer readable medium stores instructions when executed by the processor cause the processor to detect an interaction of a user of the head mounted display with a portion of the virtual model during the virtual reality mode, and indicate, as a feedback, the portion of the virtual model being interacted by the user during the virtual reality mode.

Figure 8:
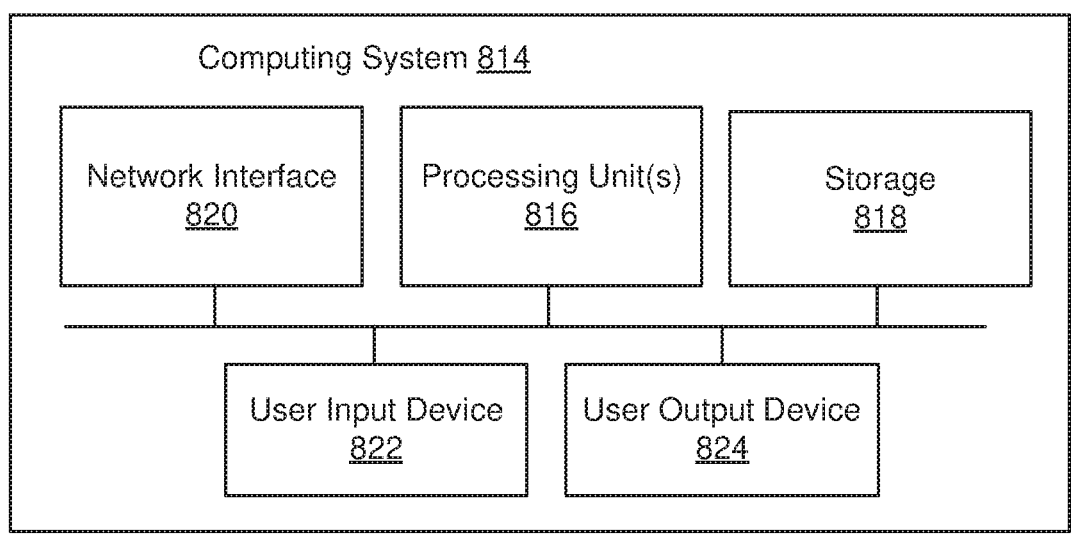
FIG. 8 is a block diagram of a computing environment according to an example implementation of the present disclosure.

Various operations described herein can be implemented on computer systems. FIG. 8 shows a block diagram of a representative computing system 814 usable to implement the present disclosure. In some embodiments, the console 110, the HMD 150 or both of FIG. 1 are implemented by the computing system 814. Computing system 814 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 814 can be implemented to provide VR, AR, MR experience. In some embodiments, the computing system 814 can include conventional computer components such as processors 816, storage device 818, network interface 820, user input device 822, and user output device 824.

Network interface 820 can provide a connection to a wide area network (e.g., the Internet) to which WAN interface of a remote server system is also connected. Network interface 820 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 822 can include any device (or devices) via which a user can provide signals to computing system 814; computing system 814 can interpret the signals as indicative of particular user requests or information. User input device 822 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 824 can include any device via which computing system 814 can provide information to a user. For example, user output device 824 can include a display to display images generated by or delivered to computing system 814. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 824 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 816 can provide various functionality for computing system 814, including any of the functionality described herein as being performed by a server or client, or other functionality associated with message management services.

It will be appreciated that computing system 814 is illustrative and that variations and modifications are possible. Computer systems used in connection with the present disclosure can have other capabilities not specifically described here. Further, while computing system 814 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   detecting a first contour or a first layout of an input device in a physical space relative to a user of the input device;
   identifying, from a plurality of candidate models having various levels of similarity to the first contour or the first layout of the input device and corresponding to a same device type as the input device, a candidate model having a second contour or a second layout in a virtual space, that is closest to the first contour or the first layout of the input device in the physical space, as a virtual model of the input device;
   presenting, by a display device to the user, the virtual model of the input device in the virtual space at a location and an orientation, the location and the orientation of the virtual model in the virtual space corresponding to a location and an orientation of the input device in the physical space relative to the user; and
   visually providing relative to the virtual model in the virtual space, through the display device, spatial feedback to the user on the user's interaction with the input device in the physical space.

2. The method of claim 1, further comprising:
   determining the location and the orientation of the virtual model in the virtual space according to the location and the orientation of the input device in the physical space; and
   rendering an image of the virtual space including the virtual model of the input device, according to the determined location and the orientation of the virtual model in the virtual space.

3. The method of claim 2, further comprising:
   detecting a movement of the user in the physical space;

determining a change in the location and the orientation of the virtual model relative to the user according to the detected movement of the user; and rendering another image of the virtual space including the virtual model of the input device, according to the change in the location and the orientation of the virtual model relative to the user.

4. The method of claim 2, comprising determining a six degrees of freedom of the virtual model, according to the location and the orientation of the input device.

5. The method of claim 1, wherein detecting the input device in the physical space relative to the user includes:
capturing an image of the input device, and
detecting the first contour or the first layout of the input device in the captured image.

6. The method of claim 5, wherein detecting the first contour or the first layout of the input device in the captured image includes:
determining an arrangement of keys on the input device.

7. The method of claim 1, wherein the input device comprises a keyboard.

8. A system comprising:
a display device;
a processor; and
a non-transitory computer readable medium storing instructions when executed by the processor cause the processor to:
detect a first contour or a first layout of an input device in a physical space relative to a user of the input device,
identify, from a plurality of candidate models having various levels of similarity to the first contour or the first layout of the input device and corresponding to a same device type as the input device, a candidate model having a second contour or a second layout in a virtual space, that is closest to the first contour or the first layout of the input device in the physical space, as a virtual model of the input device,
present, by the display device to the user, the virtual model of the input device in the virtual space at a location and an orientation, the location and the orientation of the virtual model in the virtual space corresponding to a location and an orientation of the input device in the physical space relative to the user, and
visually provide, relative to the virtual model in the virtual space, through the display device, spatial feedback to the user on the user's interaction with the input device in the physical space.

9. The system of claim 8, wherein the non-transitory computer readable medium storing instructions when executed by the processor cause the processor to:
determine the location and the orientation of the virtual model in the virtual space according to the location and the orientation of the input device in the physical space; and
render an image of the virtual space including the virtual model of the input device, according to the determined location and the orientation of the virtual model in the virtual space.

10. The system of claim 9, wherein the non-transitory computer readable medium storing instructions when executed by the processor cause the processor to:
detect a movement of the user in the physical space,
determine a change in the location and the orientation of the virtual model relative to the user according to the detected movement of the user, and
render another image of the virtual space including the virtual model of the input device, according to the change in the location and the orientation of the virtual model relative to the user.

11. The system of claim 9, wherein the processor is configured to determine a six degrees of freedom of the virtual model, according to the location and the orientation of the detected input device.

12. The system of claim 8, wherein the processor is configured to detect the input device in the physical space relative to the user by:
capturing an image of the input device, and
detecting the first contour or the first of the input device in the captured image.

13. The system of claim 8, wherein the input device is a keyboard.

14. The system of claim 13, wherein the instructions when executed by the processor to cause the processor to detect a layout of keys of the keyboard to identify, from the plurality of candidate models, the candidate model having the second contour or the second layout.

15. A head mounted display comprising:
an imaging sensor configured to capture an image of an input device in a physical space;
a processor configured to:
detect from the captured image, a first contour or a first layout of the input device in the physical space relative to a user of the input device, and
identify, from a plurality of candidate models having various levels of similarity to the first contour or the first layout of the input device and corresponding to a same device type as the input device, a candidate model having a second contour or a second layout in a virtual space, that is closest to the first contour or the first layout of the input device in the physical space, as a virtual model of the input device; and
a display device configured to:
present to the user the virtual model of the input device in the virtual space at a location and an orientation, the location and the orientation of the virtual model in the virtual space corresponding to a location and an orientation of the input device in the physical space relative to the user, and
visually provide, relative to the virtual model in the virtual space, spatial feedback to the user on the user's interaction with the input device in the physical space.

16. The head mounted display of claim 15, wherein:
the processor is configured to determine the location and the orientation of the virtual model in the virtual space according to the location and the orientation of the input device in the physical space; and
the display device is configured to render an image of the virtual space including the virtual model of the input device, according to the determined location and the orientation of the virtual model in the virtual space.

17. The head mounted display of claim 16, wherein:
the processor is configure to detect a movement of the user in the physical space, and determine a change in the location and the orientation of the virtual model relative to the user according to the detected movement of the user, and
the display device is configured to render another image of the virtual space including the virtual model of the input device, according to the change in the location and the orientation of the virtual model relative to the user.

18. The head mounted display of claim 15, wherein the processor is configured to determine a six degrees of freedom of the virtual model, according to the location and the orientation of the input device.

19. The head mounted display of claim 15, wherein the input device is a keyboard.

20. The head mounted display of claim 19, wherein the processor is configured to detect a layout of keys of the keyboard to identify, from the plurality of candidate models, the candidate model having the second contour or the second layout.

\* \* \* \* \*